(12) United States Patent
Rhoads et al.

(10) Patent No.: US 11,057,661 B2
(45) Date of Patent: Jul. 6, 2021

(54) METHOD AND APPARATUS FOR PERSONAL MULTIMEDIA CONTENT DISTRIBUTION

(71) Applicant: INTERDIGITAL CE PATENT HOLDINGS, Paris (FR)

(72) Inventors: Steven Rhoads, Carmel, IN (US); Douglas Strachota, Indianapolis, IN (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 109 days.

(21) Appl. No.: 16/305,049

(22) PCT Filed: Jun. 22, 2016

(86) PCT No.: PCT/US2016/038665
§ 371 (c)(1),
(2) Date: Nov. 27, 2018

(87) PCT Pub. No.: WO2017/204835
PCT Pub. Date: Nov. 30, 2017

(65) Prior Publication Data
US 2020/0236414 A1 Jul. 23, 2020

Related U.S. Application Data

(60) Provisional application No. 62/342,241, filed on May 27, 2016.

(51) Int. Cl.
*H04N 21/2668* (2011.01)
*H04N 21/2347* (2011.01)
(Continued)

(52) U.S. Cl.
CPC ..... *H04N 21/2668* (2013.01); *H04N 21/2347* (2013.01); *H04N 21/2665* (2013.01); *H04N 21/43615* (2013.01); *H04N 21/4532* (2013.01)

(58) Field of Classification Search
CPC .... H04N 21/25; H04N 21/266; H04N 21/278; H04N 21/2668; H04N 21/2323; H04N 21/2365; H04N 21/86
See application file for complete search history.

(56) References Cited

U.S. PATENT DOCUMENTS 6,088,495 A 7/2000 Vorobeichik et al.
6,678,004 B1 1/2004 Schultheiss et al.
(Continued)

FOREIGN PATENT DOCUMENTS

CA 2310308 A1 12/2000
CN 1852416 A 10/2006
(Continued)

OTHER PUBLICATIONS

Song, "The 21st China Digital Broadcasting, Television and Network Development Annual Conference and the 12th National Internet and Audio Video Broadcasting Development Seminar," Broadcast-Broadband Convergence Interactive TV Technology Research (Apr. 18, 2014).

Primary Examiner — Jefferey F Harold
Assistant Examiner — Timothy R Newlin
(74) Attorney, Agent, or Firm — Volpe Koenig

(57) ABSTRACT

Efficient techniques are provided for distributing video and data from the internet to the TV in order to permit easier access to new means of communications, e.g., internet. Each personal stream associated with an individual may only be watched on the individual's receiver. The personal stream is paired to the receiver identification number included in the signaling data associated with the personal stream. A personalized program guide may be generated including information about the personal stream and may only be watched on the individual's receiver. Obfuscation of the stream types associated with the personal stream may be performed.

(Continued)

Methods and apparatuses for transmitting and receiving a signal are provided.

26 Claims, 5 Drawing Sheets

(51) Int. Cl.
*H04N 21/2665* (2011.01)
*H04N 21/436* (2011.01)
*H04N 21/45* (2011.01)

(56) References Cited

U.S. PATENT DOCUMENTS

| | | | |
|---|---|---|---|
| 6,985,411 B2 | 1/2006 | Kanegae et al. | |
| 8,311,382 B1* | 11/2012 | Harwell | H04N 5/44591 386/200 |
| 8,615,778 B1* | 12/2013 | Evans | H04N 21/25891 725/119 |
| 8,634,310 B2 | 1/2014 | Singhai et al. | |
| 8,752,103 B2 | 6/2014 | Mukerji et al. | |
| 8,752,110 B2* | 6/2014 | Mukerji | H04N 7/17318 725/110 |
| 2002/0056119 A1* | 5/2002 | Moynihan | H04L 29/06027 725/87 |
| 2002/0073435 A1* | 6/2002 | Handelman | H04N 7/165 725/122 |
| 2002/0118608 A1* | 8/2002 | Oishi | H04N 21/42684 369/1 |
| 2004/0114036 A1* | 6/2004 | Karaoguz | H04L 67/306 348/142 |
| 2004/0117786 A1* | 6/2004 | Kellerman | H04L 67/306 717/170 |
| 2004/0117822 A1* | 6/2004 | Karaoguz | H04L 29/06027 725/37 |
| 2004/0117834 A1* | 6/2004 | Karaoguz | H04N 7/17309 725/80 |
| 2004/0117838 A1* | 6/2004 | Karaoguz | H04N 21/4126 725/86 |
| 2004/0117845 A1* | 6/2004 | Karaoguz | H04L 12/2803 725/134 |
| 2004/0123333 A1* | 6/2004 | Nakatsuyama | H04N 21/4345 725/142 |
| 2006/0123455 A1* | 6/2006 | Pai | H04N 21/6405 725/133 |
| 2007/0028279 A1* | 2/2007 | Kim | H04N 21/4223 725/113 |
| 2007/0078768 A1* | 4/2007 | Dawson | H04N 21/2743 705/50 |
| 2007/0140300 A1* | 6/2007 | Handekyn | H04L 29/06027 370/486 |
| 2007/0199019 A1* | 8/2007 | Angiolillo | H04N 21/6334 725/39 |
| 2008/0288890 A1* | 11/2008 | Anderson | H04N 21/4825 715/810 |
| 2009/0164559 A1* | 6/2009 | Johnson | H04N 21/4788 709/203 |
| 2009/0183213 A1* | 7/2009 | Mukerji | H04N 21/431 725/95 |
| 2009/0199254 A1* | 8/2009 | White | H04N 21/466 725/110 |
| 2009/0222858 A1* | 9/2009 | Hjelm | H04N 21/43615 725/47 |
| 2009/0313674 A1* | 12/2009 | Ludvig | H04N 21/6118 725/118 |
| 2010/0017824 A1 | 1/2010 | Malik | |
| 2010/0023979 A1* | 1/2010 | Patel | H04N 21/2743 725/93 |
| 2010/0246597 A1* | 9/2010 | Ma | H04N 21/435 370/431 |
| 2011/0113441 A1 | 5/2011 | Jeong et al. | |
| 2011/0131598 A1* | 6/2011 | Park | H04N 21/26283 725/25 |
| 2012/0192225 A1* | 7/2012 | Harwell | H04N 21/2668 725/34 |
| 2012/0269207 A1* | 10/2012 | Jang | H04L 65/605 370/535 |
| 2012/0272263 A1* | 10/2012 | Sharma | H04N 21/4722 725/32 |
| 2015/0141140 A1* | 5/2015 | Lampe | H04N 21/8549 463/31 |
| 2015/0148128 A1* | 5/2015 | Kim | A63F 13/60 463/31 |
| 2015/0237389 A1 | 8/2015 | Grouf et al. | |
| 2017/0257497 A1* | 9/2017 | Ono | F24F 11/30 |

FOREIGN PATENT DOCUMENTS

| | | |
|---|---|---|
| CN | 10368336 A | 3/2014 |
| EP | 0952734 A2 | 10/1999 |
| EP | 2200250 A1 | 6/2010 |
| WO | WO 0115455 A1 | 3/2001 |
| WO | WO 2013045123 A1 | 4/2013 |
| WO | 2016/031914 A1 | 3/2016 |

* cited by examiner

METHOD AND APPARATUS FOR PERSONAL MULTIMEDIA CONTENT DISTRIBUTION

CROSS-REFERENCE TO RELATED APPLICATIONS

This application claims the benefit of and priority to the U.S. Provisional Patent Application: Ser. No. 62/342,241 and titled "METHOD AND APPARATUS FOR PERSONAL MULTIMEDIA CONTENT DISTRIBUTION", filed on May 27, 2016. The provisional application is expressly incorporated by reference herein in its entirety for all purposes.

TECHNICAL FIELD

The present disclosure relates to personal multimedia content distribution, in particular, personal video, audio and data distribution for a multi-receiver distribution environment.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Unlike analog home and office networks of the past, today's digital home, multi-dwelling unit (e.g., apartment complex, hotel, senior living facility, hospital, etc.) and office networks can distribute audio, video and data from one device to another, and can also support interactive dialogues between devices or between a device and the Internet. In particular, the advancement of low cost short range wireless communications has allowed many services to evolve and new services to be created within the home, multi-dwelling unit and office environment. The traditional personal computer (PC), mobile and consumer electronics (CE) domains are coming together and creating a melting pot of new interactive applications and interactive appliances blurring the boundaries of these traditional domains. For the consumer, service operators and device vendors, this evolution offers a continuous flow of new compelling applications, use cases and business opportunities which would be unthinkable in the past.

However, despite incredible widespread use of technology, there is still a segment of the population that is not versed in the latest electronic gadgets and ways and means to access information on the internet. For example, it is still common that the elderly community does not feel comfortable handling the latest electronic gadgets like smart phones, accessing social networks, e.g., Facebook™, Twitter™, Youtube™, etc., or even exchanging electronic email. This becomes particularly difficult when other members of the family, e.g., grandchildren, utilize such gadgets and forms of communication almost exclusively. However, the use of television (TV) has become ubiquitous worldwide and is familiar to the majority of the population, including the elderly.

Therefore, there is a need to provide efficient techniques for distributing video and data from the internet to the TV in order to permit easier access to new means of communications. The present disclosure is directed towards such a technique.

SUMMARY

According to an aspect of the present disclosure, an apparatus for transmitting a signal is provided including a content processor that receives a first personal stream associated with a first individual and at least one second personal stream associated with at least one second individual, generates a first program map table and at least one second program map table for the first and at least one second personal streams, the first program map table including a receiver identification number for a first receiver used by the first individual and the at least one second program map table including at least one receiver identification number for at least one second receiver used by the at least one second individual, merges the first and the at least one second personal streams and the first and at least one second program map tables into at least one third stream, and a transmitter coupled to the content processor that transmits a signal including the at least one third stream in at least one physical channel of the frequency spectrum.

According to an aspect of the present disclosure, a method of transmitting a signal is provided, the method including receiving a first personal stream associated with a first individual and at least one second personal stream associated with at least one second individual, generating a first program map table and at least one second program map table for the first and at least one second personal streams, the first program map table including a receiver identification number for a first receiver used by the first individual and the at least one second program map table including at least one receiver identification number for at least one second receiver used by the at least one second individual, merging the first and the at least one second personal streams and the first and at least one second program map tables into at least one third stream and transmitting a signal including the at least one third stream in at least one physical channel of the frequency spectrum.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
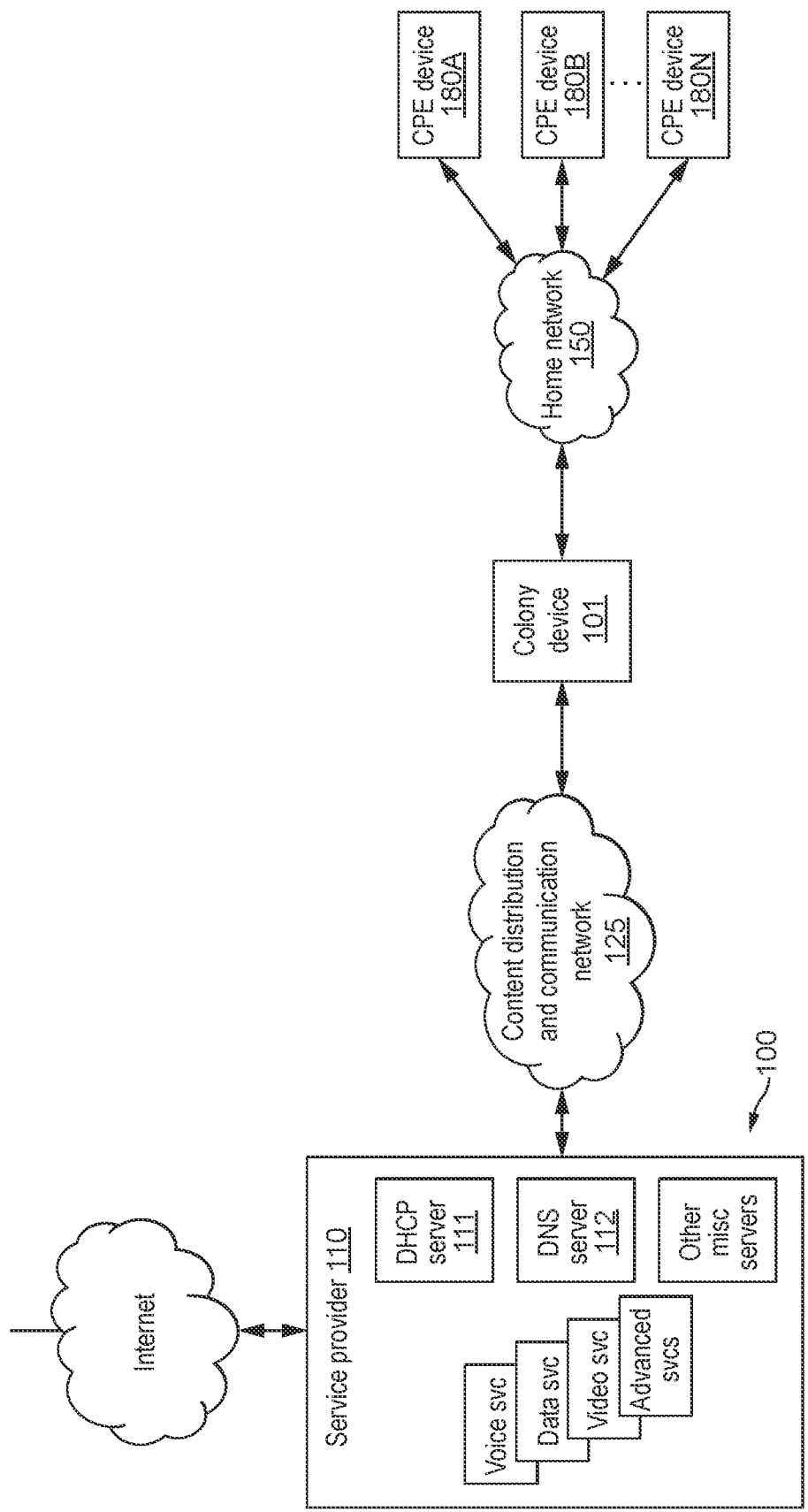
FIG. 1 illustrates a block diagram of an exemplary content distribution and communication network system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is directed to efficient techniques for distributing video, audio and data from the internet to the TV in order to permit easier access to new means of communications, in particular, to a segment of the population that is not versed in the latest electronic gadgets, and ways and means to access information on the internet, due to age, disability, poverty, location, etc. For example, it is still common that the elderly community does not feel comfortable handling the latest electronic gadgets like smart phones, accessing social networks, e.g., Facebook™, Twitter™, Youtube™, Instagram™, etc., or even exchanging electronic email. This becomes particularly difficult when other members of the family, e.g., grandchildren, utilize such gadgets and forms of communication almost exclusively. Besides age, disability, poverty, location, etc. also prevent individuals from becoming familiar with the latest electronic means of communications. Another issue appears in facilities, e.g., hotels, hospitals, senior living facilities, apartment complexes, etc., that have not been upgraded to the newest technologies, due to financial reasons, location, or other reasons, particularly in under developed areas of the world. However, TVs have become ubiquitous all over the world, and are familiar to the majority of the population, including the elderly, and may be used to bring the internet to the home in an easier way.

Turning to FIG. 1, a block diagram of a typical arrangement for a content distribution and communication network system 100 according to aspects of the present disclosure is shown. According to an exemplary embodiment, colony device 101 is an advanced receiver and transmitter system which may include a cable gateway, cable modem, DSL (Digital Subscriber Line) modem, router or the like, and is coupled to service provider 110 through content distribution and communication network 125 via at least one of a receiver circuit and a wide area network (WAN) interface. The content distribution and communication network 125 may be one or more of the possible communication and/or broadcast links including, but not limited to, coaxial cable, fiber optic cable, telephone line, or over the air links. The colony device 101 is also coupled to home network 150 which is coupled to one or more customer premises equipment (CPE) devices 180A-N. The home network 150 may include a wireless link but may also include wired links such as co-axial cable or Ethernet. CPE devices 180A-N may include, for example, personal computers, network printers, digital set-top boxes, and/or audio/visual media servers and players, among others.

Service provider 110 provides one or more services, such as voice, data, video and/or various advanced services, over content distribution and communication network 125 to CPE devices 180A-N through colony device 101 and home network 150. Service provider 110 may include Internet related services and server structures such as a Dynamic Host Configuration Protocol (DHCP) server 111 and Domain Name System (DNS) server 112, and may include other servers and services as well (e.g., video on demand, news, weather). It is important to note that these servers and services can be co-located or widely distributed, physically and/or virtually, in both hardware and software. It is contemplated that service provider 110 operates in a conventional manner in accordance with well-known protocols (e.g., Data Over Cable Service interface Specification, DOCSIS).

The audio and video plus any signaling data and metadata content (e.g., electronic program guide, EPG, also known as program guide, or program metadata) may be supplied in at least one of two forms: broadcast form or video on demand (VOD) form, that is, content requested by the user. Program guide is an application used with digital set-top boxes and newer television sets to list current and scheduled programs that are or will be available on each channel and a short summary or commentary for each program. Content distribution and communication network (125) may include satellite link transmission from a national center to one or more regional or local centers, as well as local content delivery using local delivery systems such as over the air broadcast, satellite broadcast, or cable broadcast. Content distribution and communication network (125) may also incorporate Internet content into the delivery system via high-speed broadband communications.

Connectivity from the service operator or provider 110 to the customer's premises (home, multi-dwelling unit or office environment) via content distribution and communication network 125 may be accomplished via at least one medium, including cable/fiber, circuit switched or landline telephone, also known as Public Switched Telephone Network (PSTN), cellular or mobile telephone, satellite, over the air terrestrial broadcast, wireless cable over microwave (e.g., Multichannel Multipoint Distribution Services), other wireless networks, etc. Some networks like cable, PSTN (e.g., using Digital Subscriber Line, DSL or xDSL, technology) and cellular or mobile telephone networks permit full connectivity through duplex communication channels, including downstream and upstream channels. Downstream channels are used to transmit signals from the server, or service provider to the user or subscriber. Upstream channels are used to transmit signals from the user to the server. Satellite, over the air terrestrial broadcast and wireless cable service providers cannot provide duplex communication through their respective mediums and generally combine their downstream systems with upstream channels or services of other service providers (e.g., PSTN, cellular telephone, cable) to accomplish full connectivity to the customer's premises.

Service provider 110 may be more than one service provider, each providing a different service. In an illustrative application, service provider 110 may be, for example, a satellite based multiple service operator (MSO). The satellite based operator (e.g., DirecTV™) may include a video/audio downstream communication path and a PSTN based upstream path, as well as PSTN based internet connection (e.g., AT&T™).

Colony device 101 acts as the interface between content distribution and communication network 125 external to the customer's premises and the home network 150 located in the customer's premises. Colony device 101 receives a signal or converts transport data packets, such as packets in an IP protocol, from a format used in content distribution and communication network 125 to a format used in home network 150. Colony device 101 also routes data packets, including the converted data packets between the content distribution and communication network 125 and one or more devices on the home network. Colony device 101 may include interfaces for both wired networking (e.g., cable, Ethernet or Multimedia over Coaxial cable Alliance (MoCA)) and wireless networking (e.g., Bluetooth). Colony device 101 allows data, voice, video and audio communication between content distribution and communication network 125 and CPE devices 180A-N used in the customer's premises, such as analog telephones, televisions, computers, set-top boxes, digital video recorders (DVR), and the like.

It is important to note that in some configurations, colony device 101 may be partitioned into two or more separate devices coupled together in some communicative manner. A first device, connected to the broadcast portion of content distribution and communication network 125, may be referred to as a receiver. A second device connected to the WAN portion of the system may be referred to as a cable modem or network termination device (NTD). A third device, connected to the home LAN portion of the system, may be referred to as a home router, a home server, a home gateway, or a transmitter. Functionally, and as will be described below, the first, second and third devices operate in a manner consistent with colony device 101. In an illustrative application, colony device 101 may include, for example, a cable broadcast based transmitter which broadcasts video, audio, voice and data to the various CPE devices 180A-N through the cable network within the customer's premises.

Figure 2:
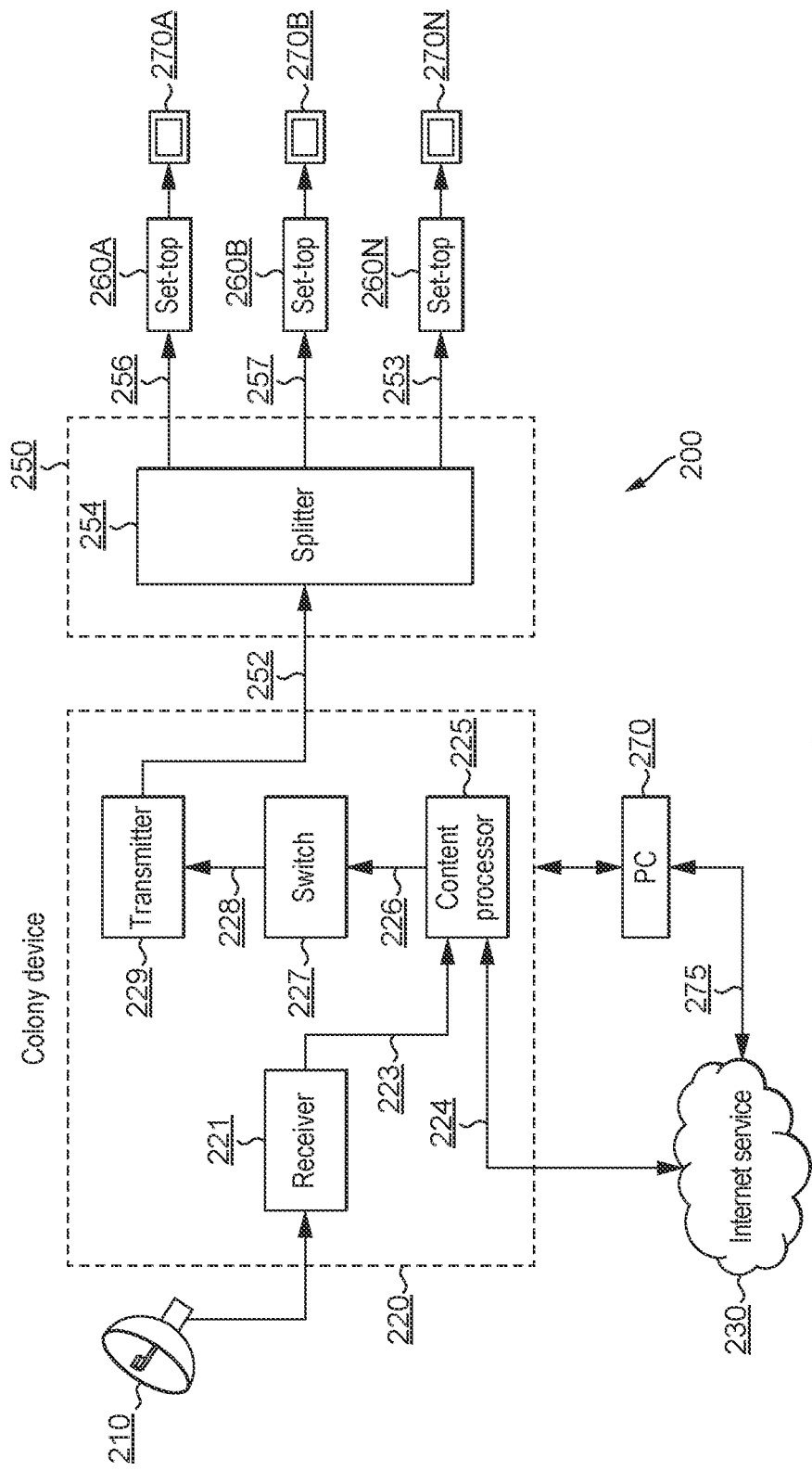
FIG. 2 illustrates a block diagram of an exemplary content distribution and communication network system within a customer's premises in accordance with an embodiment of the present disclosure.

FIG. 2 illustrates a block diagram of an exemplary customer's premises content distribution and communication network system 200 according to aspects of the present disclosure. A satellite based service provider similar to service provider 110 transmits a satellite signal over a plurality of physical channels. Each physical channel corresponds to one segment of the frequency spectrum of the medium over which the signal is transmitted. For single carrier modulated systems, like satellite and cable systems, the term physical channel and carrier are used interchangeably. For example, in the US broadcast television system, each physical channel corresponds to 6 MHz of the frequency spectrum, or a 6 MHz bandwidth. The satellite signal may be received by at least one satellite antenna 210 (including at least one Low Noise Block, LNB) coupled to colony device 220. Colony device 220 is similar to colony device 101, and is coupled to home network 250. Home network 250 may be a cable home network similar to home network 150, and may be coupled to one or more set-top boxes or receiver devices 260A, 260B and 260N. Set-top boxes 260A-N are similar to CPE devices 180A-N and are respectively coupled to TV sets or displays 270A, 270B and 270N. In addition, an internet or cloud based service 230, provided by a service provider similar to service provider 110, communicates with colony device 220, delivering video, audio and/or data content from the internet. Internet service 230 may be at least one of the innumerable services available on the internet, for example, a social network like Sherish™, Facebook™, Twitter™, Youtube™, Instagram™, etc., or a video on demand service like Netflix™, Amazon™, etc.

In one exemplary embodiment of the present disclosure, the customer's premises may be a senior living facility including a plurality of senior individuals or persons, each living in a separate apartment or room in the facility, and each using a separate and respective set-top box or receiver device 260A-N and TV or display device 270A-N. For example, senior person 1 uses set-top box 1 and TV 1, while senior person 2 uses set-top box 2 and TV 2. In one exemplary embodiment of the present disclosure, each senior individual living in the senior living facility may be assigned a Sherish™ account which is shared with or accessed by family members and/or friends. The family members and friends of the senior individual may place pictures, electronic cards, other images and/or video clips in the account to be viewed by the senior individual on his/her respective TV, as a slide show or video clip. The Sherish™ account may be created by the management of the senior facility, by a family member or friend of the senior individual, by Sherish™ in cooperation with the service provider, or by the senior individual (although less likely in this case). In one embodiment, the customer's premises may be a mental institution or a hospital including a plurality of patients.

It is to be understood that, without loss of generality, more than one senior individual may share one set-top box or receiver device and TV or display device, for example, if they are married, friends or live together. However, for simplicity purposes, two or more individuals sharing a set-top box and TV will be referred to as one individual in the present disclosure, since they share viewership of their respective contents. It is to be understood that although the present disclosure permits easier access to new means of communications, in particular, to a segment of the population, it is not restricted to just a segment of the population but may ultimately be used by any individual, whether or not the individual is familiar with the latest electronic gadgets, social networks and the internet, and whether or not the individual is a senior person, poor, disabled, etc. In one embodiment, the customer's premises may be a home with various rooms, each with a set-top box or receiver device and TV or display device used by a different individual living in the home. In one embodiment, the customer's premises may be a hotel, a high rise building, or an apartment complex, with a plurality of rooms, condos, or apartments inhabited by a plurality of individuals.

Colony device 220 may include at least one receiver circuit 221 that demodulates, decodes and possibly decrypts the satellite input signal output from the LNB. Receiver 221 may be any of the well-known receiver circuits by one of ordinary skill in the art. Receiver 221 produces a transport stream including packets according to one of the known standard formats. A transport stream is a standard container format for transmission and storage of audio, video, and ancillary data, e.g., Program Specific Information (PSI) data, Program and System Information Protocol (PSIP) data, Digital Video Broadcasting Service Information (DVB-SI) data, etc. The PSI data is the Moving Picture Experts Group (MPEG) 2 standard data that identifies what parts of the transport stream belong to a particular program. It provides information to enable automatic configuration of the receiver to de-multiplex and decode the various streams of programs within the multiplex. The PSIP data provides an Advanced Television Systems Committee (ATSC) extension to MPEG 2 for service information. It provides identification of streams associated with a program and time of day information. It provides sufficient data for a program guide function, and is structured such that a broadcaster may provide data independently for his own service (in which case the receiver can assemble a guide from several sources), or in cooperation with other broadcasters. DVB-SI provides corresponding service information for the DVB standard. The transport stream format may be the MPEG transport stream (TS) format. The transport stream may include multiple program streams, i.e., a plurality of multiplexed data, video and audio programming streams from the satellite provider to be distributed to the customer's premises. The program streams are bundled in groups where each group is associated with one physical channel. For example, it is common to have 3 concurrent Standard Definition (SD) digital program streams (or equivalently, 3 virtual channels), or 1 High Definition (HD) program stream per physical channel. Receiver 221 is coupled to content processor 225 over, e.g., an Ethernet link 223. In one embodiment, receiver 221 includes a Quadrature Phase Shift Keying (QPSK) demodulator. In one embodiment, decoding includes channel or error correction decoding.

Content processor 225 may include a web browser (not shown) and communicate with internet service 230 over, e.g., an Ethernet link 224, receiving video, audio and/or data content from the internet. Content processor 225 may, for example, receive data from internet service 230 including a number of personal pictures, or even a number of slide shows of personal pictures e.g., from a plurality of Sherish™ accounts. Content processor 225 may also receive a number of personal video clips (including audio), e.g., from a plurality of Instagram™ accounts. In one embodiment, content processor 225 may include a content generator (not shown) which may generate a video slide show from personal pictures and/or electronic cards received from internet service 230, or may edit/modify video clip content received from internet service 230. The slide show may be a low bit rate stream including the pictures, and/or electronic cards, music or other forms of audio, e.g., voice. The content processor 225 may edit the video clip content to compress it, to encrypt it, or to change a data format for compatibility purposes. Each slide show or video clip may be source encoded or compressed according to well-known methods of source encoding. For example, the video content may be encoded with MPEG-2 or High Efficiency Video Coding (HEVC), and the audio content may be encoded with MPEG-1 layer 2 or Dolby's Digital Audio Codec 3 (AC-3). Each slide show or video clip is then formatted in one of the well-known transport protocol formats, e.g., MPEG-2 TS, as a single program transport stream (including multiplexed audio, video and/or data associated with the program). Finally content processor 225 may insert or merge, or combine the various personal single program transport streams (also herein referred to as personal program stream or personal stream) corresponding to the personal slide shows or video clip streams received from internet service 230 into the transport stream delivered by receiver 221. According to the present disclosure, a personal stream is a private stream associated with an individual or more than one individual (e.g., a family, a group of friends). Hence, it is to be understood that the word personal indicates belonging to or associated with one or more individuals and not meant for public knowledge or consumption.

The insertion or merging process performed by content processor 225 may assign each personal single program transport stream for each of the plurality of personal slide shows and/or video clip streams to a separate virtual channel or program, and may bundle a number of virtual channels or programs into one physical channel. As previously mentioned, a physical channel is identified as one carrier of the physical spectrum, for example, channel 2 in the US cable TV system is a 6 MHz bandwidth channel located at frequencies between 54 and 60 MHz, and may contain a plurality of virtual channels or programs addressed as 2.1, 2.2, 2.3, etc. Therefore, each individual is associated with a separate personal stream, and a corresponding separate virtual channel. Depending on the bandwidth or data rate of the slide show or video clip transport streams, dozens or even hundreds of personal single program transport streams may be bundled in just one or more multiple program transport streams, each representing one physical channel or carrier.

In addition, the insertion or merging process performed by content processor 225 may merge the plurality of personal multiple program transport streams with the transport stream from receiver 221 (including non-personal or public broadcast streams), where each personal multiple program transport stream is associated with a particular carrier of the home network system and includes a plurality of personal single program transport streams from a plurality of individuals. In one embodiment, one individual may own or be associated with one only or more personal single program transport streams (or personal program streams). In one embodiment, one individual may own or be associated with one only or more personal multiple program transport streams (also herein referred to as personal bundled program streams, or personal bundled streams). The personal bundled program streams of one individual may represent a portion of the content of one physical channel, the entire content of one physical channel, or the content of more than one physical channel.

Moreover, the insertion process performed by content processor 225 may modify signaling data, including the original data associated with transport stream from receiver 221 to include information about the inserted personal multiple program transport streams and their corresponding individuals (or owners) and carriers, for reception and program guide purposes, as will be described in greater detail below. Content processor 225 may also modify the original data associated with the transport stream from receiver 221 in case physical channels are to be changed in switch 227, as described below. In one embodiment, the content processor 225 may modify the Program Map Table (PMT) of the transport stream.

The PMT is part of the Program Specific Information (PSI) contained in an MPEG transport stream, which includes metadata about the programs contained in the transport stream. The PMT is comprised of sections for each program number represented in the transport stream, each section of which contains the packet id (PID) and characteristics of each elementary stream (e.g., video, audio, etc.) in the program service, including elementary stream type. For instance, a transport stream used in digital television might contain three programs representing three television channels (or virtual channels). Each channel may consist of the following elementary streams: one video stream, one or two audio streams, and any necessary metadata. It may also be said that each section associated with a different program is a PMT. In one embodiment, content processor 225 may generate a PMT for each personal single program transport stream. For example, a PMT is generated for a personal program stream from individual 1 and another PMT is generated for a personal program stream from individual 2. A receiver wishing to decode a particular personal program stream merely has to decode the payloads of each PID associated with the personal program stream. It can discard or exclude or not include the contents of all other PIDs. According to the present disclosure, PMT refers to any table containing such information (i.e., metadata about programs contained in the transport stream including program number, and PIDs and elementary stream types for each elementary stream of a program) and is not restricted to MPEG transport streams.

Content processor 225 may also be coupled to switch 227 over, e.g., an Ethernet link 226. Switch 226 may receive the modified transport stream from content processor 225, where the modified transport stream includes the transport stream from receiver 221 and the personal multiple program transport streams received from internet service 230 and inserted in content processor 225. Switch 227 may be coupled to transmitter 229 over, e.g., an Ethernet link 228. Switch 227 may assign the plurality of physical channel representative transport streams present in the modified transport stream to a corresponding plurality of physical channels in transmitter 229, not necessarily in the same order. For example, physical channel 1 received by receiver 221 may become physical channel 15 transmitted by transmitter 229. In addition, the number of physical channels in transmitter 229 may be smaller than the number of physical channel representative transport streams out of content processor 225. However, it is to be understood that, for program guide purposes, the information contained in the program guide must match the physical channels assigned to the various transport streams, so appropriate changes in the PMT may need to be made for the receiver to make the necessary channel changes. In one embodiment, switch 227 may be directly coupled to receiver 221 over, e.g. an Ethernet link and transfers the output transport stream from receiver 221 to transmitter 229. Switch 226 may be optional. In one embodiment, switch 225 is removed and the personal multiple program transport streams are assigned in the content processor 225 to physical channels not covered by the transport stream from receiver 221.

Transmitter 229 may be a transmitter circuit well-known by those skilled in the art that encodes and modulates the modified and switched transport stream out of switch 227. In one embodiment, transmitter 229 may be a cable transmitter. In one embodiment, transmitter 229 may include a Quadrature Amplitude Modulation (QAM) modulator. In one embodiment, encoding includes channel or error correction encoding. In one embodiment, transmitter 229 may also encrypt the transport stream prior to encoding and modulating. In one embodiment, transmitter 229 may decrypt the transport stream and then re-encrypt the transport stream with a different encryption system, prior to encoding and modulating the transport stream. For example, transmitter 229 may decrypt DirectTV™ VideoGuard encryption present in the transport stream from receiver 221 and re-encrypt the transport stream in Zenith™ Pro:Idiom encryption.

Transmitter 229 may transmit the modulated modified and switched transport stream as a broadcast radio frequency (RF) signal over cable network 250. Cable network 250 may include coaxial cables 252, 256-258 and splitters 254, and may also include amplifiers (not shown). Cable network 250 couples transmitter 229 to a plurality of set-top boxes or receiver devices 260A, 260B and 260N which each receive the broadcast RF signal. The set-top boxes 60A, 260B and 260N are each coupled to a TV or display device 270A, 270B and 270N, respectively. Each set-top box may be coupled to a TV or display device via a High-Definition Multimedia Interface (HDMI).

It is to be understood that several components necessary for complete operation of the system are not shown in the interest of conciseness, as they are well known to those skilled in the art. While embodiments of the invention utilize, QPSK demodulators, QAM modulators and MPEG-2 transport streams, it will be appreciated by those skilled in the art that other kinds of modulators and demodulators are equally usable and many different types of transport protocols are also usable. Therefore, Vestigial Sideband (VSB) modulators/demodulators, QPSK modulators/demodulators, Orthogonal Frequency Division Multiplexing (OFDM) modulators/demodulators, and their equivalents are all covered by the current invention. Moreover, Internet Protocol (IP) signaling transport streams, Digital Video Broadcasting (DVB) transport streams, MPEG-4 transport streams, Association of Radio Industries and Businesses ARIB) transport streams, and their equivalents are also covered by the present disclosure.

Colony device 220 may be controlled by an internal controller (not shown). The controller may be implemented as a circuit or may include a processor and at least one memory. The at least one memory may be a RAM and/or ROM capable of carrying instructions to be executed by the processor. Colony device 220 may also include a storage device (not shown), e.g., a Hard Disc Drive (HDD) for voice, audio, video and data storage. Colony device may also include a modem (not shown), e.g., a cable modem or xDSL modem for access to the internet. Optionally, a PC 270 may interface with colony device 220 to access the internet, to set up parameters and/or control the data programming necessary to accomplish the control operations. PC 270 may be any of well-known computing devices, e.g., a laptop, tablet, desktop, smart phone, etc. PC 270 may be coupled to internet service 230 over, e.g., an Ethernet link 275.

It is to be understood that receiver 221 may be optional and may be removed from colony device 220. In this case, the network only includes one service, that is, internet service 230 providing personal content to colony device 220. Colony device merges the various personal program streams to create a personal transport stream to be transmitted over home/cable network 250 by transmitter 229.

It is to be understood that the various blocks of colony device 220 may be implemented as separate devices, or a combination of them may be implemented as separate devices. For example, in one embodiment, content processor 225 and controller (not shown) may be implemented as a separate device. In one embodiment, content processor 225 and transmitter 229 may be implemented as a separate device. In one embodiment, content processor 225, controller (not shown) and transmitter 229 may be implemented as a separate device.

It is to be understood that changes in format may be performed for the transport stream from the receiver 221 in order to be compatible with transmitter 229, particularly when receiver 221 and transmitter 229 are compatible with different respective standards. The change in format may affect the video, audio, and signaling data, e.g., program guide. The format conversion may be performed by content processor 225.

As previously mentioned, the present disclosure aims at distributing video and data from the internet to the TV in order to permit easier access to new means of communications, in particular, to a segment of the population that is not versed in the latest electronic gadgets, and ways and means to access information on the internet, due to age, disability, poverty, and/or lack of means of access. It is therefore of interest that each personal program stream "owned" by or associated with an individual may only be watched by the corresponding individual. According to the present disclosure, in order to ensure the privacy of the plurality of individuals in the customer's premises, each personal program stream owned by or associated with an individual (e.g., a senior individual living in a senior living facility) is paired with or matched to the set-top box 260A-N (hence, to the corresponding TV or display device 270A-N) used by the same individual. The pairing may be performed by a Receiver Identification (RID) number (e.g., serial number of the device, internet protocol (IP) address, media access control (MAC) address, etc.) which is included in the signaling data associated with the personal single program stream.

In one embodiment, the content processor 225 may add a descriptor to the PMT of each personal program stream which identifies the RID number of the set-top box (260A-N) used by the owner of the personal program stream. At the receiver side, the set-top box 260A-N disregards or discards any personal program streams not paired to its RID number. In one embodiment, other descriptors may be added to the PMT of each personal program stream, including at least one of: a desired major and minor channel number (e.g., 50.1) that the user should see for this channel in the program guide display, a channel name (e.g., "FAMILY") and an event title (e.g., "Mary's family pictures") that the user should also see. The event title may appear, for example, in the channel banner of the display device 270A-N when an INFO button is pressed on the display device 270A-N, where the INFO button, when pressed, causes the display of information about the channel currently being watched on the screen of the particular display device 270A-N. The event title may also appear in the channel grid of the program guide when a GUIDE button is pressed on the display device 270A-N, where the GUIDE button, when pressed, causes the display of the program guide on the screen of the particular display device 270A-N. It is to be understood that the notion of a major and minor channel may generally be associated with a physical channel and a virtual channel within the physical channel, but the numbers could be different, and there could only be one major channel number encompassing both numbers.

It is also of interest that set-top boxes or receiver devices that have not been modified to check the RID in order to ignore non-paired personal channels may also not be able to play any of the personal channels in the customer's facility. In one embodiment, the content processor 225 may obfuscate the personal program streams by modifying or transforming the stream type of each elementary stream of the PMT of a personal program stream (including audio, video and ancillary data) to an unknown type, unrecognizable by general receivers or set-top boxes. For example, the stream type for MPEG2 video may be 2 and the stream type for MPEG 1 layer 2 audio may be 3. The content processor 225 may exclusive-or the stream type of each elementary stream with 0x10 Hex (or 16 decimal format), or any other number that results in the stream types being unrecognizable by a general receiver or set-top box. Or the content processor 225 may assign different unrecognizable numbers to the stream types of the elementary streams of the personal program streams utilizing a different function or transformation. At the receiver side, the set-top box 260A-N may be instructed to de-obfuscate or undo the modification or transformation operation of the content processor 225 only for the personal program stream(s) associated with its RID number. The de-obfuscation implies performing the inverse function or transformation. By undoing the operation for the personal program streams(s) associated with its RID number, the stream type of each elementary stream of the personal program stream(s) associated with its RID number becomes recognizable again and can be played on corresponding display device 270A-N. However, since the other personal program streams not paired to its RID number have not had their PMT descriptors changed back to recognizable values, the corresponding display device 270A-N associated with its RID number cannot understand/recognize the streams and will not be able to display them. Similarly, any set-top box 260A-N that has not been modified to recognize RID numbers in the modified PMT's in order to identify the personal program streams will not be able to understand/recognize the elementary stream types (since the numbers are unrecognizable, that is, are not numbers known by the receivers to be associated with the particular elementary streams) and will not be able to play them. Hence, a receiver that has not been modified according to the present disclosure will not recognize any of the personal streams. A receiver that has been modified according to the present disclosure will only recognize personal streams associated with its receiver identification number. In one embodiment, obfuscation is only applied to personal streams. Hence, non-personal or public streams (e.g., received at receiver 221) are not protected and may be visible by any set-top box or receiver device.

In one embodiment, the obfuscation of the personal program streams is performed by encryption, where the elementary stream types associated with a personal program stream are encrypted with an encryption key that is a function of the RID number paired to the personal program stream. At the receiver side, only the set-top box 260A-N with the corresponding RID number is able to perform the decryption and appropriately recover and display the content of the personal program stream. In one embodiment, the elementary streams are encrypted with an encryption key that is a function of the RID number paired to the personal program stream. Hence, only the set-top box 260A-N with the corresponding RID number is able to perform the decryption and appropriately display the content of the personal program stream. Similarly, any set-top box 260A-N that has not been modified to recognize RID numbers in the modified PMT's in order to identify the personal program streams will not be able to understand/recognize the elementary streams and will not be able to play them, since they are encrypted.

In addition, it is of interest that individuals in the customer's premises, besides not being able to watch personal program streams of other individuals, do not even see the existence of personal program streams of other individuals in their respective program guides. In one embodiment, the program guide PSI and Service Information (SI) tables (e.g., PSIP or DVB-SI tables) of each individual in the customer's premises may be individually generated in the content processor 225, including the PMT and possibly event information table (EIT). An EIT provides scheduling information of events in a program stream. It is to be understood that generation of program guides is well-known by those skilled in the pertinent art and will not be described in detail. The generation of the program guide for an individual associated with a set-top box RID number comprises including in the personal program guide only the schedule of personal program streams paired with the corresponding RID number and disregarding or excluding or not including other personal program streams not paired with the corresponding RID number. For example, if individual 1 uses set-top box with RID number 1, then only personal program streams paired with RID number 1 in the corresponding PMT will appear in the program guide visible at the display device coupled to set-top box 1. Similarly, if individual 2 uses set-top box with RID number 2, then only personal program streams paired with RID number 2 in the corresponding PMT will appear in the program guide visible at the display device coupled to set-top box 2. Individual 2 does not see personal program streams paired with RID number 1 in his program guide and cannot watch programs paired with RID number 1. Similarly, Individual 1 does not see personal program streams paired with RID number 2 in his program guide and cannot watch programs paired with RID number 2. Each personal program guide for each individual (or equivalently, RID number) may further include programs associated with the original transport stream from receiver 221, which may also have a corresponding program guide data that may be incorporated into the personal program guides. In one embodiment, the program guide scheduled information of each personal program stream, including PMT and possibly EIT tables, may be incorporated into the transport stream by content processor 225 and sent to transmitter 228. In one embodiment, the generation of the personalized program guide for each RID number may be performed by each respective set-top box 260A-N from program guide data.

Different concurrent program streams are allocated to different virtual channels, as previously mentioned. In the program guide, different concurrent program streams or virtual channels are also allocated to different program guide channels (or different program guide major and minor channels, if the numbering has a major and minor number, e.g., 10.1). In general, there is a relation between the program guide channel numbers and the physical and virtual channel number, but the two numbering systems may be quite distinct. However, different concurrent program streams generally appear in a program guide as different program guide channel numbers.

According to the present disclosure, it may be of interest that the same program guide channel number is assigned to concurrent personal program streams of different individuals in the customer's premises, even though each individual can only see and watch their respective personal program stream using their respective set-top boxes. For example, individual 1 sees channel number 50 in the program guide associated with (his) personal program stream 1 on his TV 1 and individual 2 sees the same channel number 50 in the program guide associated with (his) personal program stream 2 on his TV 2. However, individual 1 can only watch personal program stream 1, and individual 2 can only watch personal program stream 2. This is possible if the desired virtual major and minor channel descriptor in the PMT is assigned to the same number for different individuals. In one embodiment, content processor assigns the same number for virtual major and minor channel descriptor in the PMT of personal program streams from different individuals. As a result, the personal program streams by different individuals may be uniquely identified but commonly presented using a common channel identifier in the program guide. Hence, at least one channel in the program guide may map different contents to different users. This feature of sharing channel numbers in the program guide is entirely possible as a result of a combination of the features described above:

i. Each individual only sees his own program guide and the program guide points to the same channel for each individual.
  ii. The receiver is instructed to disregard/discard/exclude/not include the personal program streams not paired to its RID number. Hence, at the receiver side, there is no confusion about the channel and device to which the program guide is referring, and proper channel changes are performed.

Of course, the feature described above assumes that each individual has only one personal program stream. If some individuals have more than one personal program stream, separate or distinct individuals can still share virtual major and minor channel numbers for the additional personal program streams. For example, individual 1 sees channel number 50.1 and 50.2 in the program guide associated with his 2 personal programs on his TV 1 and individual 2 sees the same channel numbers 50.1 and 50.2 in the program guide associated with his 2 personal program streams on his TV 2. However, individual 3 only has one personal program stream and only sees channel number 50.1 in the program guide associated with his only personal program stream on his TV 3. Equivalently, the numbers may be 501 and 502.

Figure 3:
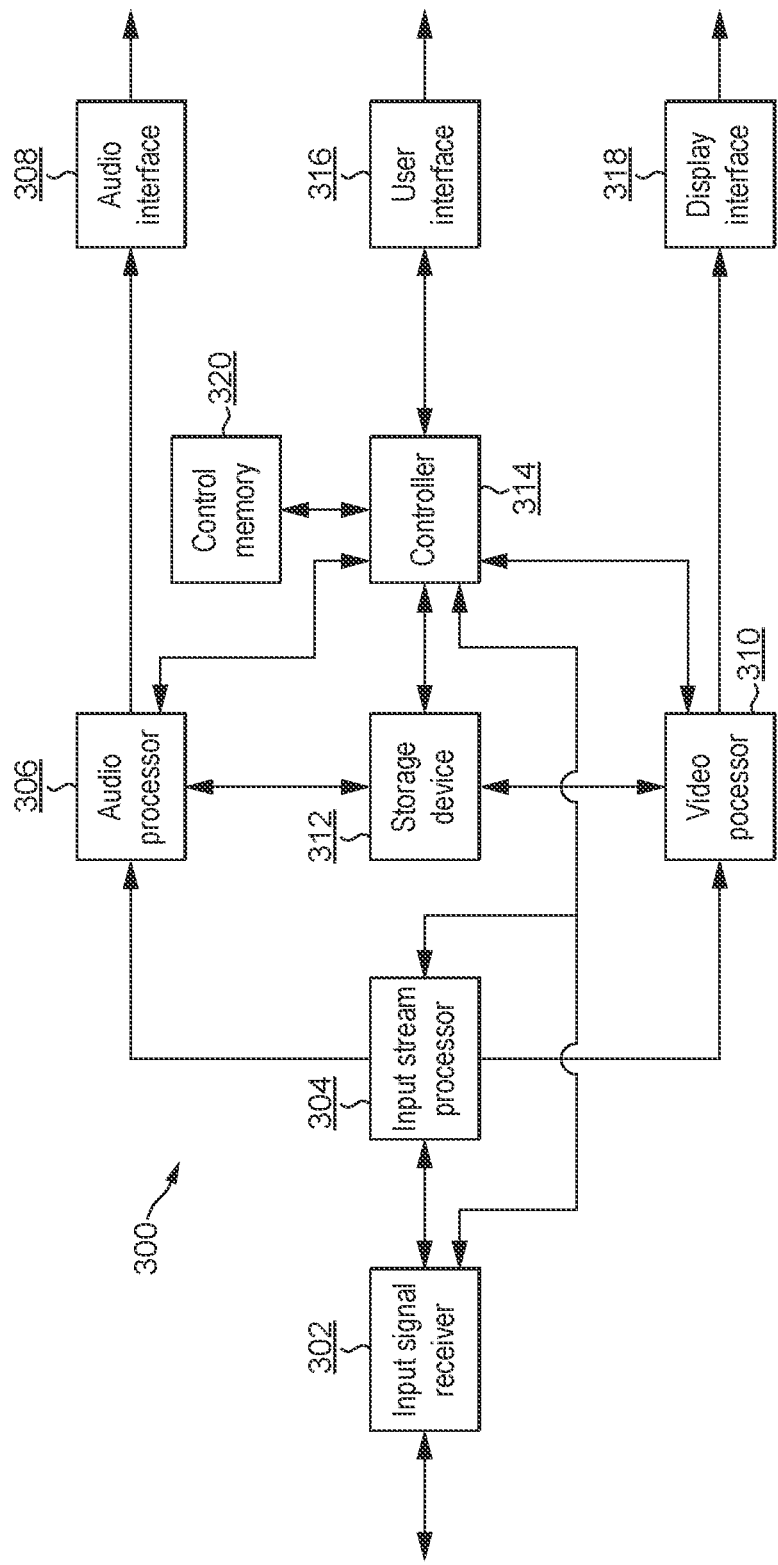
FIG. 3 illustrates a block diagram of an exemplary set-top box device in accordance with an embodiment of the present disclosure.

Turning now to FIG. 3, a block diagram of an embodiment of the core of a set top box/digital video recorder (DVR) or receiver device 300 is shown according to aspects of the present disclosure. Set-top box 300 may be similar to set-top boxes 260A, 260B and 260N described in FIG. 2, and CPE devices 180A, 180B and 180N described in FIG. 1. The device 300 shown may also be incorporated into other systems including the display device 270A, 270B or 270N. In either case, several components necessary for complete operation of the system are not shown in the interest of conciseness, as they are well known to those skilled in the art.

In device 300 shown in FIG. 3, the content may be received in input signal receiver 302. Input signal receiver 302 may be one of several known receiver circuits used for receiving, demodulating, and decoding signals provided over one of the several possible networks including over the air, cable, satellite, Ethernet, fiber and phone line networks. The desired input signal may be selected and retrieved in input signal receiver 302 based on user input provided through a control interface (not shown) or controlled by controller 314. The decoded output signal may be provided to input stream processor 304 that is coupled to input signal receiver 302. Input stream processor 304 may perform the final signal selection and processing, and may include separation of video content from audio content for the content stream. Input stream processor 304 may be coupled to audio processor 306 and video processor 310.

The audio content from input stream processor 304 may be provided to audio processor 306 for conversion from the received format, such as compressed digital signal, to an analog waveform signal and may include decompressing the audio content (e.g., according to MPEG-1 layer 2 or AC-3 standard). The analog waveform signal may be provided to audio interface 308 and further to the display device (similar to 270A, 270B or 270N) or an audio amplifier (not shown). Alternatively, audio interface 308 may provide a digital signal to an audio output device or display device using an HDMI cable or alternate audio interface such as via a Sony/Philips Digital Interconnect Format (SPDIF). Audio processor 306 may also perform any necessary conversion for the storage of the audio signals.

The video output from input stream processor 304 may be provided to video processor 310. The video signal may be one of several formats. Video processor 310 may provide, as necessary, a conversion of the video content based on the input signal format, and may include decompressing the video content (e.g., according to MPEG-2 or HEVC standard). Video processor 310 may also perform any necessary conversion for the storage of the video signals.

Storage device 312 may be coupled to audio processor 306 and/or video processor 310, and may store audio and/or video content received at the input. Storage device 312 allows later retrieval and playback of the content under the control of a controller 314 and also based on commands, e.g., navigation instructions such as fast-forward (FF) and rewind (Rew), received from a user interface 316. The storage device 312 may be a hard disk drive, one or more large capacity integrated electronic memories, such as static random access memory, or dynamic random access memory, or may be an interchangeable optical disk storage system such as a compact disk drive or digital video disk drive.

The converted video signal, from the video processor 310, either originating from the input or from the storage device 312, may be provided to the display interface 318. The display interface 318 may further provide the display signal to a display device of the type described above. The display interface 318 may be an analog signal interface such as red-green-blue (RGB) or may be a digital interface such as HDMI.

Controller 314 may be coupled via a bus to several of the components of the device 300, including input signal receiver 301, input stream processor 302, audio processor 306, video processor 310, storage device 312, and user interface 316. Controller 314 manages the conversion process for converting the input stream signal into a signal for storage on the storage device or for display. Controller 314 also manages the retrieval and playback of stored content. Controller 314 may be further coupled to control memory 320 (e.g., volatile or non-volatile memory, including RAM, dynamic RAM, ROM, programmable ROM, flash memory, EPROM, EEPROM, etc.) for storing information and instruction code for controller 314. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

It is to be understood that receiver device 300 may include display functionality (270A-N). In addition, receiver device 300 may be, but is not limited to: a television, a set-top box, a digital video recorder (DVR), a computer, a smart phone, an automobile receiver and a tablet.

According to the present disclosure, input stream processor 304 of set-top box 300 may perform additional operations as previously described, associated with embodiments of colony device 220. In one embodiment, input stream processor may disregard or discard or not include or exclude any personal program stream not paired with the RID number of its corresponding set-top box (260A-N). The RID number is a device identification number of the set-top box (e.g., serial number) and may be hard coded in a ROM, or in an Integrated Circuit (IC) register. It may also be stored in a RAM or flash memory, if defined via a user interface. Input stream processor 304 may access the RID number for its corresponding set-top box and compare it against the RID number stored in the PMT of a personal program stream. In one embodiment, if the set-top RID number and the PMT RID number match, the input stream processor 304 may include the PID associated with the PMT in a list of available program streams or channels. If the set-top RID number and the PMT RID number do not match, the input stream processor 304 may not include the PID associated with the PMT in a list of available program streams. In one embodiment, if the set-top RID number and the PMT RID number match, the input stream processor 304 may include the channel major and minor number associated with the PMT in a list of available program streams. If the set-top RID number and the PMT RID number do not match, the input stream processor 304 may not include the channel major and minor number associated with the PMT in a list of available program streams (or virtual channels).

In one embodiment of the present disclosure, input stream processor 304 may generate a list of available channels or program streams. The list of available channels may include physical channels and/or virtual channels available in the input signal. In one embodiment, the list of available channels may include the major and minor virtual channel descriptors that are recognized by the set-top box 300 for display. In one embodiment, the list of available channels may include the PID of available program streams. In one embodiment, the list of available program streams or virtual channels includes personal program streams and non-personal program streams, e.g., streams associated with the transport stream from receiver 221.

In one embodiment, at least one of a channel name (e.g., "FAMILY") and an event title (e.g., "Mary's family pictures") may also be added to the generated list. The channel name may appear in the channel banner of the program guide at the display device 270A-N. The event title may also appear, for example, in the channel banner of the display device 270A-N when an INFO button is pressed on the display device 270A-N, where the INFO button, when pressed, causes the display of information about the channel currently being watched on the screen of the particular display device 270A-N. The event title may also appear in the channel grid of the program guide when a GUIDE button is pressed on the display device 270A-N, where the GUIDE button, when pressed, causes the display of the program guide on the screen of the particular display device 270A-N.

In one embodiment according to the present disclosure, device 300, upon start-up or a request by a user, may perform a channel scan or search to identify or determine all the available channels in the spectrum of the transmission medium. The channel scan or search may be performed by input signal receiver 302 and/or input stream processor 304 under the control of controller 314. Identifying available channels may include locking to (e.g., carrier and/or symbol timing lock) and demodulating the input signal for a physical channel of the spectrum. The scan may be performed by input signal receiver 302 at the control of controller 314. Identifying available channels may also include processing the stream and recovering the PMT and/or program guide data for available programs, at input stream processor 304. Identifying available channels may also include analyzing the PMT data at input stream processor 304 to identify video and/or audio streams available for display. Identifying or determining video and/or audio streams available for display may include determining if their respective stream types included in the PMT data are recognized by device 300.

In one embodiment, input stream processor 304 may de-obfuscate stream types associated with personal program streams paired to the RID number of device 300 prior to determining if their respective stream types included in the PMT data are recognized by device 300. The de-obfuscation is the inverse function or transformation of the obfuscation performed by colony device 101, as previously described. The content processor 225 may exclusive-or the stream type of each elementary stream with 0x10 Hex or any other number that results in the stream types being unrecognizable by a general receiver or set-top box. In this case, input stream processor 304 may exclusive-or the obfuscated stream types to recover the correct values, which are recognizable by the system. Or the content processor 225 may assign different unrecognizable numbers to the stream types of the elementary streams of the personal program streams utilizing a different function or transformation. By undoing the transformation for the personal program stream(s) associated with the RID number of device 300 (e.g., devices 260A-N), the stream type of each elementary stream of the personal program stream(s) associated with the RID number becomes recognizable again and can be played on the corresponding display device (e.g., devices 270A-N) coupled to device 300. However, since the other personal program streams not paired to the RID number of device 300 do not have their PMT descriptors changed back to recognizable values, the corresponding display device associated with the RID number of device 300 cannot understand/recognize the streams as valid streams and will not be able to display them. Similarly, any set-top box 260A-N that has not been modified to recognize RID numbers in the modified PMT's in order to identify the personal program streams will not be able to understand/recognize the elementary stream types (since the numbers are unrecognizable) and will not be able to play them. In one embodiment, obfuscation is only applied to personal streams. Hence, non-personal or public streams (e.g., received at receiver 221) are not protected and may be visible by any set-top box or receiver device.

In one embodiment, the de-obfuscation of the personal program streams is performed by decryption, where the elementary stream types associated with a personal program stream are decrypted with a decryption key that is a function of the RID number paired to the personal program stream. At the receiver side, only the device 300 with the corresponding RID number is able to perform the decryption and appropriately recover and display the content of the personal program stream. In one embodiment, the elementary streams themselves are decrypted with a decryption key that is a function of the RID number paired to the personal program stream. Hence, only the device 300 with the corresponding RID number is able to perform the decryption and appropriately display the content of the personal program stream. Similarly, any set-top box 260A-N that has not been modified to recognize RID numbers in the modified PMT's in order to identify the personal program streams will not be able to understand/recognize the elementary stream and will not be able to play them, since they are encrypted.

In one embodiment, input stream processor 304 may receive personal program guide tables for personal program stream(s) paired to each RID number and identifies or selects the one(s) associated with the RID number of its respective set-top box 300. The input stream processor 304 then generates a personal program guide associated with the RID number of its set-top box, outputting the selected program guide for display based on a user's request. In one embodiment, input stream processor 304 uses the list of available program streams and their corresponding program guide tables (including PMT and possibly EIT) to generate a personal program guide including personal program streams paired to the RID number of the respective set-top box 220A-N and not including personal program streams not paired to the RID number of the respective set-top box 220A-N. For example, set-top box 1 with RID 1 is paired to personal program stream 1 from individual 1 and generates program guide 1, including program 1 information. Set-top box 2 with RID 2 is paired to personal program stream 2 from individual 2 and generates program guide 2, including program 2 information. Program guide 1 does not contain program 2, and program guide 2 does not contain program 1. In addition, program guide information of additional, non-personal program streams may be included in the personal program guides. For example, program guide information associated with the transport stream from receiver 221 may be included in program guide 1 and program guide 2.

Figure 4:
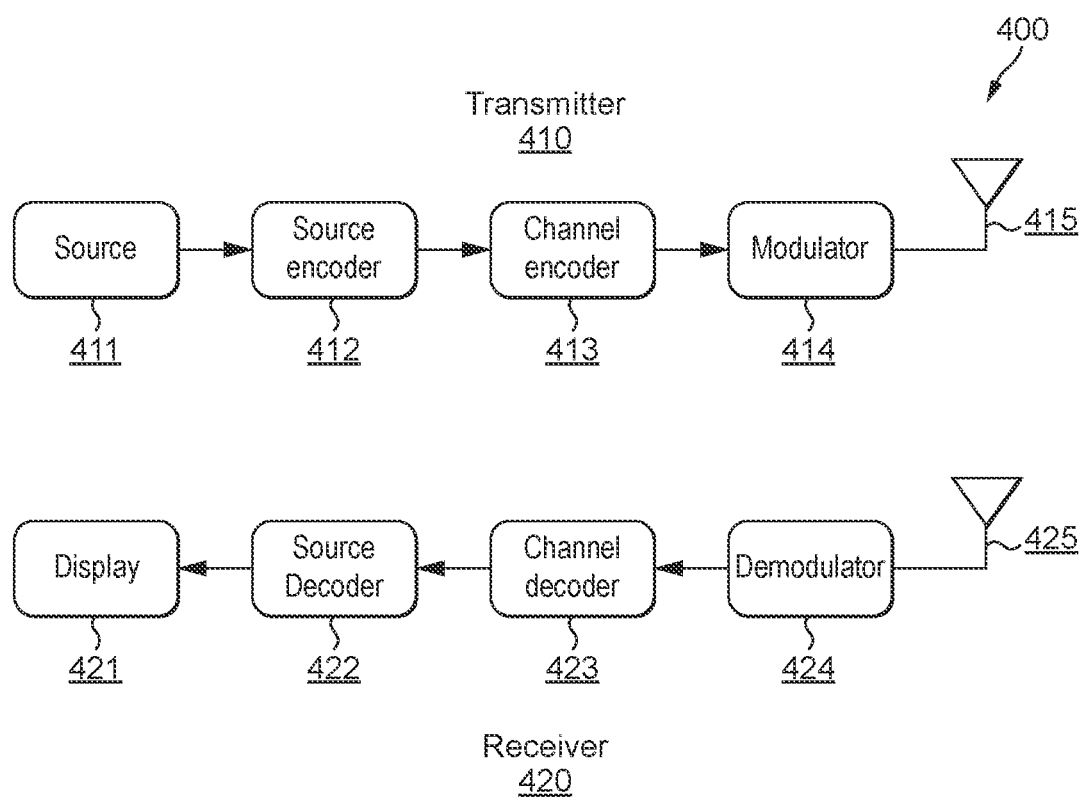
FIG. 4 illustrates a simplified block diagram of a general communication system according to the present disclosure.

FIG. 4 illustrates a simplified block diagram of a general communication system 400 according to the present disclosure, describing a general transmitter and receiver (similar to set-top box 260A-N, 300, CPE devices 180A-N). Transmitter device 410 may include the following components:

i. Source 411 for the audio, video, signaling or control and other ancillary data (e.g., program guide). It is to be understood that some transmission systems are not co-located with the source and may just receive the necessary streams from a source (e.g., transmitter 229);

ii. Source encoder 412 coupled to source 411, that may include audio and/or video encoders to compress the audio (e.g., with MPEG-1 layer 2 or AC-3 compression standard) and/or video data (e.g., with MPEG-2 or HEVC compression standard);

iii. Channel encoder 413 coupled to source encoder 412 that may include at least some of the functions of randomizing, interleaving, channel coding (e.g., convolutional or block encoder) and frame mapping to process the compressed, signaling and ancillary digital data for robustness and to add levels of error correcting encoding functionality;

iv. Modulator 414 coupled to channel encoder 413 to convert the processed digital data into modulation symbols, which can be, for example, QAM or QPSK modulation symbols. In addition, the modulator may include the functionalities of filtering and/or digital-to-analog (D/A) conversion; and v. Output interface 415 coupled to Modulator 414 that interfaces to the transmission medium and may represent the functionalities of up-conversion, RF amplification and/or over-the-air broadcasting (optional). It is to be understood that some transmission systems (e.g., cable system 200) are not over-the-air and do not require antennas.

At the receiver device 420 of communication system 400, the inverse functions of transmitter device 410 are generally performed, including the following components:

i. Input interface 425 that interfaces to the transmission medium and may represent the functionalities of over-the-air reception (optional), RF down-conversion and/or tuning. It is to be understood that some transmission systems (e.g., cable system 200) do not require antennas;

ii. Demodulator 424 coupled to input interface 425 to recover the digital data from the modulation symbols and may include the functionalities of analog-to-digital conversion (D/A), gain control, carrier and symbol timing recovery, equalization and/or header or preamble sync detection;

iii. Channel decoder 423 coupled to modulator 422 to recover the compressed and ancillary data by performing the inverse functionalities of the channel encoder, and may include error correcting decoding, de-interleaving and/or de-randomizing;

iv. Source decoder 422 coupled to channel decoder 423 to decompress the audio and/or video data, and may include video and/or audio decoders (e.g., similar to video processor 310 and audio processor 306); and v. Display device 421 coupled to source decoder 422 for audio and/or video viewing. It is to be understood that the display device 421 may be external to some receiver devices (e.g., set-top box 260A-N and 300).

It is to be understood that receiver 221 and input signal receiver 302 may include the functionalities associated with input interface 425, demodulator 424 and channel decoder 423. It is to be understood that transmitter 229 may include the functionalities associated channel encoder 413, modulator 414 and output interface 415. One of ordinary skill in the pertinent art will appreciate that a source encoder 412 and a channel encoder 413, although common in general communications systems, are not essential for a system according to the present disclosure. Similarly, depending on the transmitter, a source decoder 422 and a channel decoder 423, although common in general communications systems, are not essential for a system according to the present disclosure. In addition, the transmitter and receiver may not require an antenna, if the transmission system is other than over-the-air (e.g., over cable). Furthermore, a receiving device may include, but is not limited to: a television, a set-top box, a digital video recorder (DVR), a computer, a smart phone, an automobile receiver and a tablet.

According to one aspect of the present disclosure, an apparatus 101, 200 is provided for transmitting a signal including a content processor 225 that receives a first personal stream associated with a first individual and at least one second personal stream associated with at least one second individual, generates a first program map table and at least one second program map table for the first and at least one second personal streams, the first program map table including a receiver identification number for a first receiver 300, 260A-N, 180A-N used by the first individual and the at least one second program map table including at least one receiver identification number for at least one second receiver 300, 260A-N, 180A-N used by the at least one second individual, merges the first and the at least one second personal streams and the first and at least one second program map tables into at least one third stream, and a transmitter 229, 410 coupled to the content processor 225 that transmits a signal including the at least one third stream in at least one physical channel of the frequency spectrum.

According to one embodiment of the apparatus, the first and at least one second program map tables each may further include at least one of a desired major and minor channel number, a channel name and an event title for program guide display.

According to one embodiment of the apparatus, the desired major and minor channel number may be the same number for each of the first and the at least one second program map tables.

According to one embodiment of the apparatus, the first and the at least one second program map tables each may further include at least one stream type associated with each of the first and at least one second personal streams, respectively.

According to one embodiment of the apparatus, the content processor 225 may obfuscate the at least one stream type associated with each of the first and at least one second personal streams by transforming the at least one stream type to a value unrecognizable by receivers 300, 260A-N, 180A-N.

According to one embodiment of the apparatus, the first personal stream may only be displayed by a display device coupled to the first receiver 300, 260A-N, 180A-N and the at least one second personal stream may only be displayed by a display device coupled to the at least one second receiver 300, 260A-N, 180A-N.

According to one embodiment of the apparatus, the first and the at least one second personal streams may be allocated to the same physical channel by the transmitter 229, 410.

According to one embodiment of the apparatus, the content processor may further receive a fourth stream including a plurality of non-personal streams and merges the fourth stream into the third stream.

According to one embodiment, the apparatus may further include a third receiver 221, 420 that receives a first signal and outputs the fourth stream.

According to one embodiment of the apparatus, the first signal may be from at least one broadcast service provider 110.

According to one embodiment of the apparatus, the content processor 225 may further receive at least one second signal and generates the first and the at least one second personal streams from the at least one second signal.

According to one embodiment of the apparatus, the at least one second signal may be from at least one unicast service provider 110, 230.

According to one embodiment of the apparatus, the at least one unicast service provider may be at least one internet service provider 110, 230.

According to one embodiment of the apparatus, the at least one second signal may include at least one of private photos and private videos associated with at least the first and the at least one second individuals.

According to one embodiment of the apparatus, the content processor 225 may further generate program guide data for the first personal stream and for the at least one second personal stream, and merges the program guide data into the at least one third stream.

According to one aspect of the present disclosure, an apparatus 300, 260A-N, 180A-N is provided for receiving a signal including an input signal receiver 302, 420 that demodulates and decodes a signal to generate an input stream and an input stream processor 304 coupled to the input signal receiver that processes the input stream to: determine and retrieve a first personal stream from the input stream associated with a receiver identification number of the apparatus 300, 260A-N, 180A-N, generate a program guide for the apparatus 300, 260A-N, 180A-N, the program guide including a first program associated with the first personal stream and not including (or excluding) at least one second program associated with at least one second personal stream, the at least one second personal stream associated with at least one other receiver identification number, and output the program guide for display 270A-N based on a user's first input. It is to be understood that excluding and not including have the same meaning according to the present disclosure.

According to one embodiment of the apparatus, the input stream processor 304 may further generate a list of available channels, the list including personal streams associated with the receiver identification number for the apparatus and not including or excluding personal streams associated with at least one other receiver identification number. In one embodiment, the list of available channels includes personal program streams and non-personal program stream, e.g., streams associated with the transport stream from receiver 221.

According to one embodiment of the apparatus, the input stream processor 304 may further retrieve additional streams from the list of available channels. For example, the streams may be non-personal (or public broadcast) streams received by receiver 221 or additional personal program streams associated with the receiver identification number of the apparatus.

According to one embodiment of the apparatus, the input stream processor 304 may further include in the program guide additional programs from the additional streams.

According to one embodiment, the apparatus may further include video 310 and audio 306 decoders coupled to the input stream processor 304 that decode the first personal stream and output decoded audio and video for display 270A-N based on a user's second input.

According to one embodiment of the apparatus, the receiver identification number may be found in a first program map table for the first personal stream and the at least one other receiver identification number may be found in a respective at least one second program map table for the respective at least one second personal stream.

According to one embodiment of the apparatus, the first and the at least one second program map tables may each further include at least one of a desired major and minor channel number, a channel name and an event title for program guide display.

According to one embodiment of the apparatus, the desired major and minor channel number may be the same number for each of the first and the at least one second program map tables.

According to one embodiment of the apparatus, the first and the at least one second program map table may each further include at least one stream type associated with each of the first and at least one second personal streams, respectively.

According to one embodiment of the apparatus, the input stream processor 304 may further de-obfuscate the at least one stream type associated with the first personal stream by inverse transforming the at least one stream type to a value recognizable by the apparatus 300, 260A-N, 180A-N.

According to one embodiment of the apparatus, the program guide may only be displayed by a display device 270A-N coupled to the apparatus 300, 260A-N, 180A-N.

According to one embodiment of the apparatus, the first personal stream may only be displayed by a display device coupled 270A-N to the apparatus 300, 260A-N, 180A-N.

According to one embodiment of the apparatus, the first and the at least one second personal streams may be allocated to the same physical channel.

According to one embodiment of the apparatus, the first personal stream and the at least one second personal stream may include at least one of private photos and private videos associated with at a first individual and at least one second individual, respectively.

Figure 5:
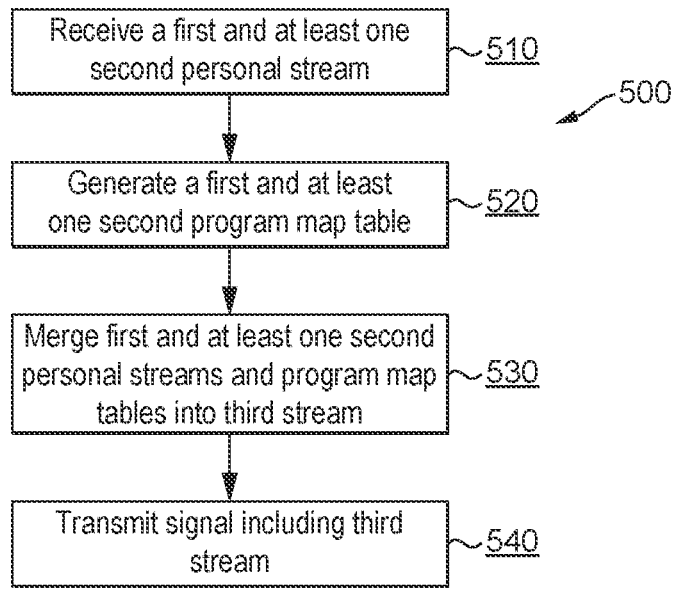
FIG. 5 illustrates a flowchart of an exemplary method of transmitting a signal in accordance to one embodiment of the present disclosure.

FIG. 5 illustrates a flowchart of an exemplary method of transmitting a signal in accordance with one aspect of the present disclosure. The method includes, at step 510, receiving a first personal stream associated with a first individual and at least one second personal stream associated with at least one second individual. The method then includes, at step 520, generating a first program map table and at least one second program map table for the first and at least one second personal streams, the first program map table including a receiver identification number for a first receiver (e.g., 300, 260A-N, 180A-N) used by the first individual and the at least one second program map table including at least one receiver identification number for at least one second receiver (e.g., 300, 260A-N, 180A-N) used by the at least one second individual. Next, at step 530, the method includes merging the first and the at least one second personal streams and the first and at least one second program map tables into at least one third stream. Finally, at step 540, the method includes transmitting a signal including the at least one third stream in at least one physical channel of the frequency spectrum. The steps 510, 520 and 530 may be performed by, for example, content processor 270. The step 540 may be performed by, for example, transmitter 229.

According to one embodiment of the method, the first and at least one second program map tables may each further include at least one of a desired major and minor channel number, a channel name and an event title for program guide display.

According to one embodiment of the method, the desired major and minor channel number may be the same number for each of the first and the at least one second program map tables.

According to one embodiment of the method, the first and the at least one second program map tables may each further include at least one stream type associated with each of the first and at least one second personal streams, respectively.

According to one embodiment, the method may further include obfuscating the at least one stream type associated with each of the first and at least one second personal streams by transforming the at least one stream type to a value unrecognizable by receivers. The step of obfuscating may be performed by, for example, content processor 225.

According to one embodiment of the method, the first personal stream may only be displayed by a display device (e.g., 270A-N) coupled to the first receiver (e.g., 300, 260A-N, 180A-N) and the at least one second personal stream may only be displayed by a display device (e.g., 270A-N) coupled to the at least one second receiver (e.g., 300, 260A-N, 180A-N).

According to one embodiment of the method, the first and the at least one second personal streams are allocated to the same physical channel.

According to one embodiment, the method may further include receiving a fourth stream including a plurality of non-personal streams and merging the fourth stream into the third stream. The step of receiving a fourth stream may be performed by, for example, content processor 225.

According to one embodiment, the method may further include receiving a first signal and outputting the fourth stream. The step of receiving a first signal may be performed, for example, by receiver 221.

According to one embodiment of the method, the first signal may be from at least one broadcast service provider (e.g., 110).

According to one embodiment, the method may further include receiving at least one second signal and generating the first and the at least one second personal streams from the at least one second signal. The step of receiving at least one second signal may be performed by, for example. content processor 225

According to one embodiment of the method, the at least one second signal may be from at least one unicast service provider (e.g., 110, 230).

According to one embodiment of the method, the at least one unicast service provider may be at least one internet service provider (e.g., 110, 230).

According to one embodiment of the method, the at least one second signal may include at least one of private photos and private videos associated with at least the first and the at least one second individuals.

According to one embodiment, the method may further include generating program guide data for the first personal stream and the at least one second personal stream, and merging the program guide data into the at least one third stream. The step of generating and merging may be performed by, for example, content processor 225.

Figure 6:
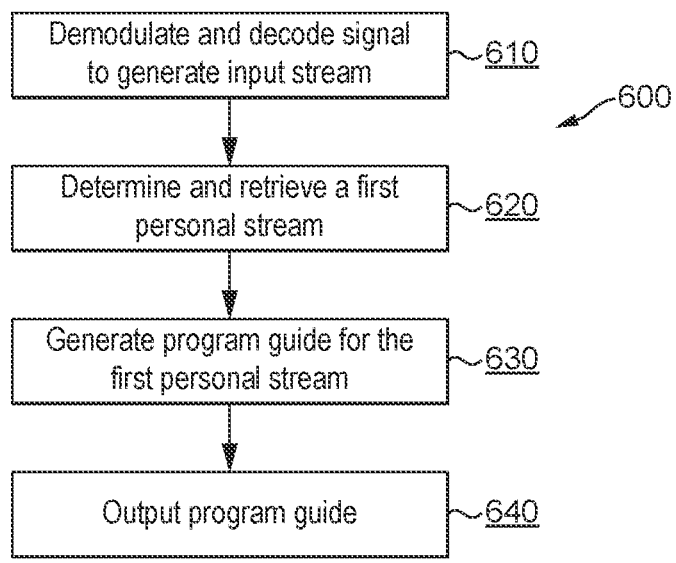
FIG. 6 illustrates a flowchart of an exemplary method of receiving a signal in accordance to one embodiment of the present disclosure.

FIG. 6 illustrates a flowchart of an exemplary method of receiving a signal in accordance with one aspect of the present disclosure. The method includes, at step 610, demodulating and decoding a signal to generate an input stream. Then, at step 620, the method includes determining and retrieving a first personal stream from the input stream associated with a receiver identification number of an apparatus (e.g., 300, 260A-N, 180A-N). Next, at step 630, the method includes generating a program guide for the apparatus (e.g., 300, 260A-N, 180A-N), the program guide including a first program associated with the first personal stream and not including (or excluding) at least one second program associated with at least one second personal stream, the at least one second personal stream associated with at least one other receiver identification number. Finally, at step 640, the method includes outputting the program guide for display based on a user's first input. The step 610 may be performed by, for example, input signal receiver 302. The steps 620, 630 and 640 may be performed by, for example, input stream processor 304.

According to one embodiment, the method may further include generating a list of available channels, the list including personal streams associated with the receiver identification number for the apparatus (e.g., 300, 260A-N, 180A-N) and not including (or excluding) personal streams associated with at least one other receiver identification number. In one embodiment, the list of available channels includes personal program streams and non-personal program stream, i.e., streams associated with the transport stream from receiver 221.

According to one embodiment, the method may further include retrieving additional streams from the list of available channels. For example, the streams may be non-personal (or public broadcast) streams received by receiver 221 or additional personal program streams associated with the receiver identification number of the apparatus.

According to one embodiment, the method may further include including in the program guide additional programs from the additional streams.

According to one embodiment, the method may further include decoding the first personal stream and outputting decoded audio and video for display based on a user's second input. The step of decoding may be performed by, for example, audio processor 306 and video processor 310.

According to one embodiment of the method, the receiver identification number may be found in a first program map table for the first personal stream and the at least one other receiver identification number may be found in a respective at least one second program map table for the respective at least one second personal stream.

According to one embodiment of the method, the first and the at least one second program map tables may each further include at least one of a desired major and minor channel number, a channel name and an event title for program guide display.

According to one embodiment of the method, the desired major and minor channel number may be the same number for each of the first and the at least one second program map tables.

According to one embodiment of the method, the first and the at least one second program map table may each further include at least one stream type associated with each of the first and at least one second personal streams, respectively.

According to one embodiment, the method may further include de-obfuscating the at least one stream type associated with the first personal stream by inverse transforming the at least one stream type to a value recognizable by the apparatus (e.g., 300, 260A-N, 180A-N). The step of de-obfuscating may be performed by, for example input stream processor 304, According to one embodiment of the method, the program guide may only be displayed by a display device (e.g., 270A-N) coupled to the apparatus (e.g., 300, 260A-N, 180A-N).

According to one embodiment of the method, the first personal stream may only be displayed by a display device (e.g., 270A-N) coupled to the apparatus (e.g., 300, 260A-N, 180A-N).

According to one embodiment of the method, the first and the at least one second personal streams may be allocated to the same physical channel.

According to one embodiment of the method, the first personal stream and the at least one second personal stream may include at least one of private photos and private videos associated with at a first individual and at least one second individual, respectively.

It is to be understood that any of the embodiments of the method 500 described above may be implemented by the colony device 220 described in FIG. 2 and its respective embodiments. It is to be understood that any of the embodiments of the method 600 described above may be implemented by the receiver device 300 described in FIG. 3 and its respective embodiments.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. An apparatus for transmitting a signal comprising:
a content processor configured to:
receive a first personal stream associated with a first individual and at least one second personal stream associated with at least one second individual,
generate a first program map table and at least one second program map table for the first personal stream and at least one second personal stream, said first program map table including a receiver identification number for a first receiver used by the first individual and the at least one second program map table including at least one receiver identification number for at least one second receiver used by the at least one second individual, and
merge the first personal stream and the at least one second personal stream and the first program map table and the at least one second program map table into at least one third stream; and
a transmitter coupled to the content processor, the transmitter configured to transmit the signal including said at least one third stream in at least one physical channel of the frequency spectrum,
wherein the first program map table and the at least one second program map table each further include at least one of a desired major channel number and a minor channel number, and wherein the desired major channel number and the minor channel number is the same number for each of the first program map table and the at least one second program map table.

2. The apparatus of claim 1, wherein the first program map table and the at least one second program map table each further include at least one stream type associated with each of the first personal stream and the at least one second personal stream, respectively.

3. The apparatus of claim 2, wherein the content processor is configured to obfuscate the at least one stream type associated with each of the first personal stream and the at least one second personal stream by transforming the at least one stream type to a value unrecognizable by receivers.

4. The apparatus of claim 1, wherein the first personal stream may only be displayed by a display device coupled to the first receiver and the at least one second personal stream may only be displayed by a display device coupled to the at least one second receiver.

5. The apparatus of claim 1, wherein the first personal stream and the at least one second personal stream are allocated to the same physical channel by the transmitter.

6. The apparatus of claim 1, wherein the content processor is further configured to receive a fourth stream comprising a plurality of non-personal streams and to merge the fourth stream into the third stream.

7. The apparatus of claim 6, further comprising:
a third receiver configured to receive a first signal and to output the fourth stream.

8. The apparatus of claim 7, wherein the signal is from at least one broadcast service provider.

9. The apparatus of claim 1, wherein the content processor is further configured to receive at least one second signal and generates the first personal stream and the at least one second personal stream from the at least one second signal.

10. The apparatus of claim 9, wherein the at least one second signal is from at least one unicast service provider.

11. The apparatus of claim 10, wherein the at least one unicast service provider is at least one internet service provider.

12. The apparatus of claim 9, wherein the at least one second signal comprises at least one of private photos and private videos associated with at least the first individual or the and said at least one second individual.

13. The apparatus of claim 1, wherein the content processor is further configured to generate program guide data for the first personal stream and for the at least one second personal stream and to merge the program guide data into the at least one third stream.

14. A method of transmitting a signal comprising:
receiving a first personal stream associated with a first individual and at least one second personal stream associated with at least one second individual;
generating a first program map table and at least one second program map table for the first personal stream and at least one second personal stream, the first program map table including a receiver identification number for a first receiver used by the first individual and the at least one second program map table including at least one receiver identification number for at least one second receiver used by the at least one second individual;

merging the first and the at least one second personal stream and the first program map table and the at least one second program map table into at least one third stream; and transmitting a signal including the at least one third stream in at least one physical channel of the frequency spectrum, wherein the first program map table and the at least one second program map table each further include at least one of a desired major channel number and a minor channel number, and wherein the desired major channel number and the minor channel number is the same number for each of the first program map table and the at least one second program map table.

15. The method of claim 14, wherein the first program map table and the at least one second program map table each further includes at least one stream type associated with each of the first personal stream and the at least one second personal streams, respectively.

16. The method of claim 15, further comprising:
obfuscating the at least one stream type associated with each of the first personal stream and the at least one second personal stream by transforming the at least one stream type to a value unrecognizable by receivers.

17. The method of claim 14, wherein the first personal stream may only be displayed by a display device coupled to the first receiver and the at least one second personal stream may only be displayed by a display device coupled to the at least one second receiver.

18. The method of claim 14, wherein the first personal stream and the at least one second personal stream are allocated to the same physical channel.

19. The method of claim 14, further comprising:
receiving a fourth stream comprising a plurality of non-personal streams; and
merging the fourth stream into the third stream.

20. The method of claim 19, further comprising:
receiving a first signal; and
outputting the fourth stream.

21. The method of claim 20, wherein the first signal is from at least one broadcast service provider.

22. The method of claim 14, further comprising:
receiving at least one second signal; and
generating the first personal stream and the at least one second personal stream from the at least one second signal.

23. The method of claim 22, wherein the at least one second signal is from at least one unicast service provider.

24. The method of claim 23, wherein the at least one unicast service provider is at least one internet service provider.

25. The method of claim 22, wherein the at least one second signal comprises at least one of private photos and private videos associated with at least the first individual or the and said at least one second individual.

26. The method of claim 14, further comprising:
generating program guide data for the first personal stream and the at least one second personal stream; and
merging the program guide data into the at least one third stream.

* * * * *